Figure 1:
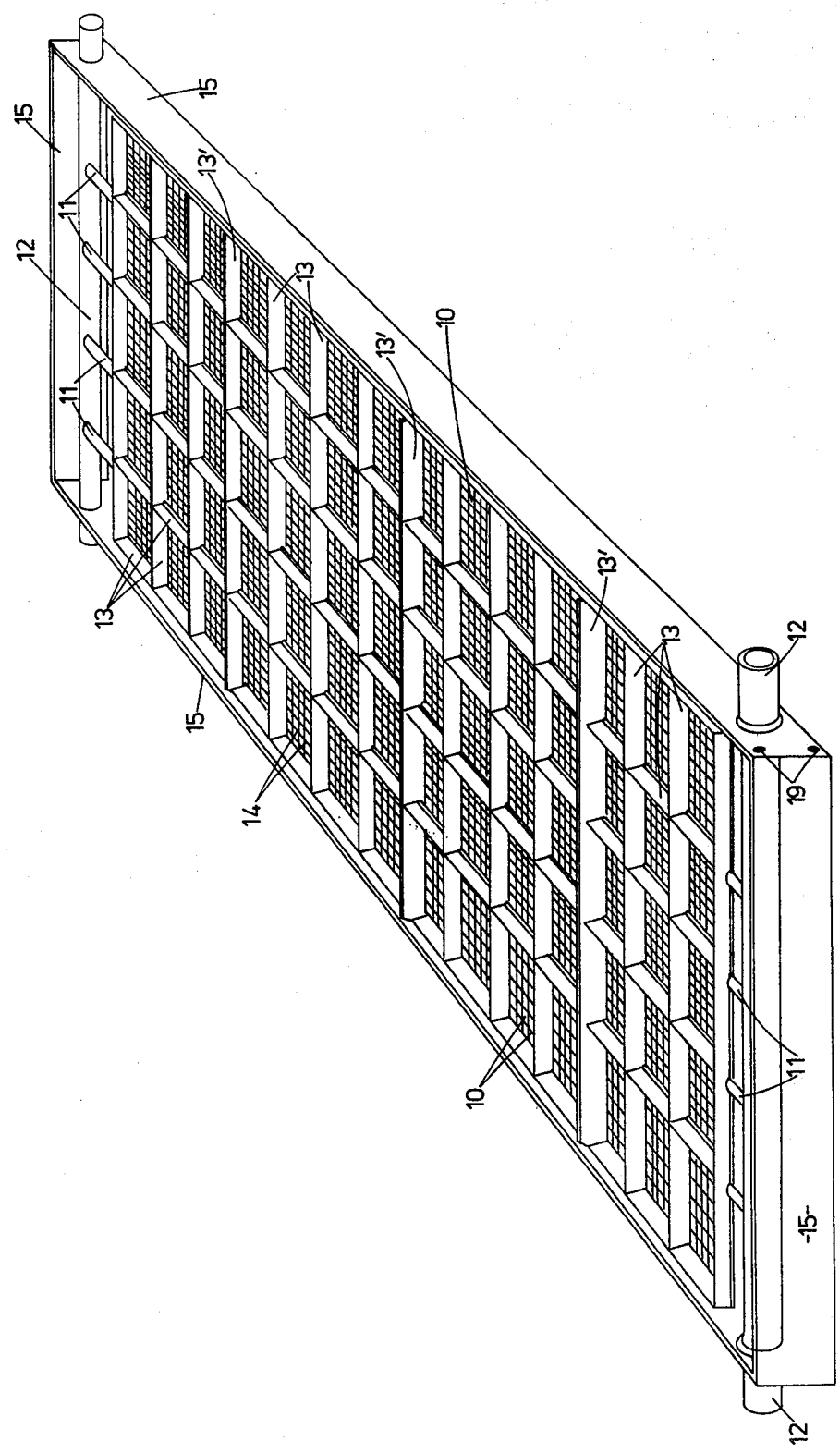

United States Patent [19]

Wilson

[11] 4,204,522
[45] May 27, 1980

[54] SOLAR HEATERS

[76] Inventor: William J. Wilson, 136 Cockburn St., Masterton, New Zealand

[21] Appl. No.: 827,544

[22] Filed: Aug. 25, 1977

[30] Foreign Application Priority Data

Aug. 25, 1976 [NZ] New Zealand .................. 181854

[51] Int. Cl.² ............................................. F24J 3/02
[52] U.S. Cl. ................................. 126/447; 126/446; 165/168
[58] Field of Search ............... 126/270, 271; 165/168, 165/171, 173, 179; 237/1 A

[56] References Cited

U.S. PATENT DOCUMENTS

| | | | |
|---|---|---|---|
| 2,480,427 | 8/1949 | Stanton | 165/168 X |
| 2,606,428 | 8/1952 | Oldfather | 165/168 X |
| 3,934,323 | 1/1976 | Ford et al. | 126/271 X |
| 3,958,553 | 5/1976 | Brantley, Jr. | 126/271 |
| 3,980,071 | 9/1976 | Barber, Jr. | 126/271 |
| 3,982,527 | 9/1976 | Cheng et al. | 126/271 |
| 4,015,586 | 4/1977 | Vroom et al. | 126/271 |
| 4,018,211 | 4/1977 | Barr | 126/270 |
| 4,019,494 | 4/1977 | Safdari | 126/270 |
| 4,019,496 | 4/1977 | Cummings | 126/271 |
| 4,027,821 | 6/1977 | Hayes et al. | 126/271 |
| 4,076,016 | 2/1978 | Phillips | 126/271 X |
| 4,080,703 | 3/1978 | Beck, Jr. | 126/271 |

FOREIGN PATENT DOCUMENTS

| | | | |
|---|---|---|---|
| 2522154 | 11/1976 | Fed. Rep. of Germany | 126/271 |
| 2303251 | 10/1976 | France | 126/271 |
| 2319860 | 2/1977 | France | 126/271 |

*Primary Examiner*—James C. Yeung
*Assistant Examiner*—Larry Jones

[57] ABSTRACT

A solar absorbing panel and housing are disclosed. The integral panel is formed with a grid like pattern of truincated triangular shaped upstanding walls extending above the panel surface. Fluid conducting tubes are embedded in the walls. An insulated housing encloses the panel. Supply and return headers mate with the tubes.

17 Claims, 3 Drawing Figures

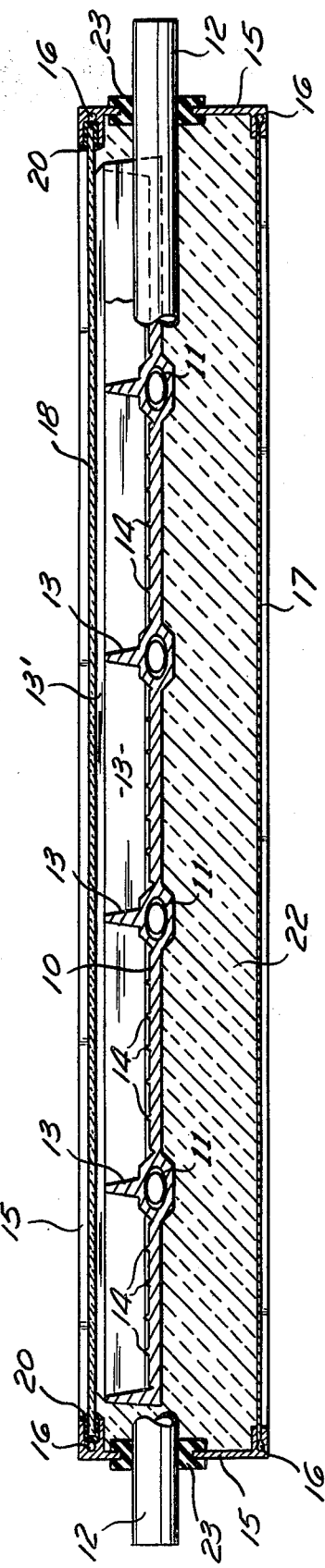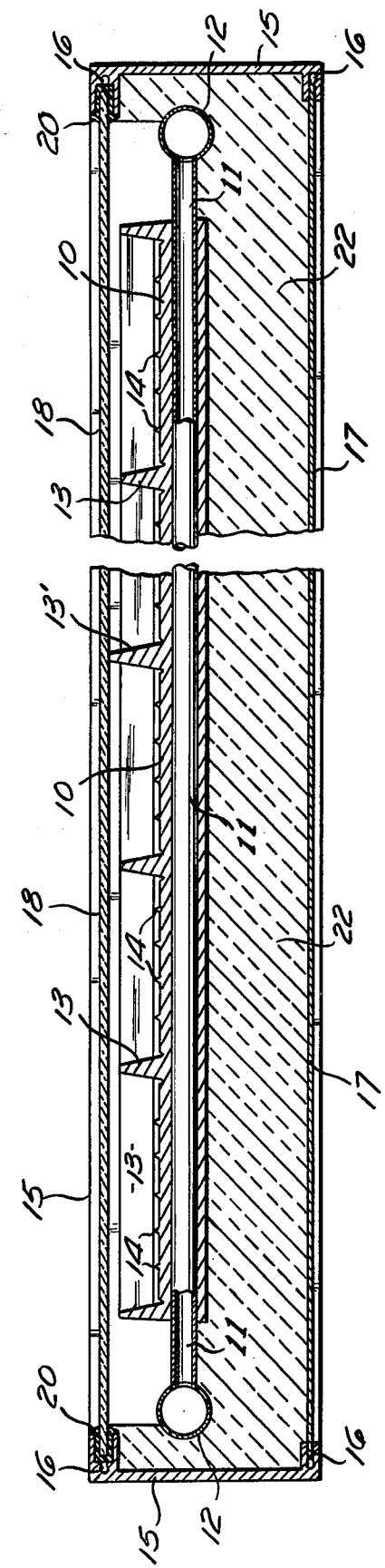

SOLAR HEATERS

This invention relates to solar heaters.

The use of solar heat in a heat exchanging device to heat water for domestic or industrial purposes is well known. Usually a solar heating device comprises a heat exchanger which has a surface which is located at some optimum angle of inclination towards the sun depending on the latitude and orientation of the site. The heat exchanger is enclosed in a box having a glass top and is internally insulated behind the heat exchanger to prevent heat loss by conduction. The heat exchanger is connected to a tank for storage of heated water and water circulates through the exchanger to the tank by a small pump or thermosiphon action.

Solar heaters of this type are attractive propositions in those areas where heated water is required and there is a high average amount of solar heat available. The attraction increases in areas where supplies of electricity are not readily available or where the electricity tariffs are high. On the other hand a solar heating device is not such an attractive proposition if the capital cost of the device is high so that for a considerable period of time the costs exceed those of having conventional water heating. For this reason it is important to be able to provide a heat exchanger that is of simple construction which uses a minimum quantity of material and requires little skilled labour for its assembly.

In addition the efficiency of the heat exchanger should be as high as possible and to this end it is desirable that loss of heat be kept to an absolute minimum. With known solar heat exchangers it has been found that heat loss occurs because of convection air currents passing over the hot exchanger panel surface and circulating down the inside surface of the cold covering glass. Accordingly, movement of the air around the exchanger should be restricted so that there is little heat lost by convection.

Broadly the invention consists of a heat exchanger for a solar heater comprising two or more pipes located within a one piece panel and upstanding walls extending from the surface of the panel which in use is the uppermost surface.

In the following more detailed description of the invention reference will be made to the accompanying drawings in which:

FIG. 1 is a perspective view,
FIG. 2 is a section view, and
FIG. 3 is another section view.

The panel 10 is preferably of cast aluminium or aluminium alloy construction with pipes 11 located therein. The pipes 11, there being four in the embodiment shown and preferably of copper construction, are parallel with each other and project each end of the panel 10. The projecting ends of the pipes 11 join into a header or manifold pipe 12 located adjacent each end of the panel 10. One header pipe 12 serves as an inlet to the pipes 11 and the other pipe 12 as an outlet. If desired pipes 11 could be replaced with passageways cast in the panel and have stub pipes located in each end for coupling the panel to header pipes. Alternatively, the headers could also be cast in the panel.

To increase heat penetration efficiency without reducing water flow through pipes 11 the pipes are flattened slightly to present a narrow film of water. For example, where the pipes are 12-13 mm copper tubing they are flattened down to about 10 mm across their minor axes as it will be appreciated that the so formed pipes will have a substantially elliptical cross-section.

The panel 10 has a series of upstanding intersecting walls 13 projecting from its upper surface and these are preferably of truncated triangular cross-section shape. The walls 13 which extend longitudinally of the plate 10, except for the extreme outer walls, are located over the internal pipes 11. The transverse walls 13 are conveniently spaced so that a grid of substantially square areas are formed on the panel 10.

The walls 13 are of such a depth as to reduce radiation heat loss and are so spaced as to reduce convection heat loss. For example, in a preferred form of the invention the depth from the top of the wall 13 to the surface of the panel is 25 mm and the area bounded by the walls is in the range of 76-92 mm wide and 98-122 mm long. The wall surfaces are at an angle of 10° to the vertical. It will be appreciated that these dimensions are only by way of example and the invention is not limited thereto.

Within each square area bounded by walls 13 the surface of the panel 10 is scoured with either a grid like pattern of V shaped grooves or as shown in FIGS. 2 and 3 small upstanding ribs 14. In addition the surfaces of the panel and walls are as coarse as possible to provide maximum paint adhesion under thermal conditions.

The panel 10 is located within a housing which is conveniently constructed from extruded aluminium or aluminium alloy walls 15 which have inwardly directed grooves 16 top and bottom. An aluminium cover 17 locates between the lower grooves 16 of walls 15 and a glass cover 18 between the upper grooves 16. A plastics material seal 20 locates the glass cover 18 in grooves 16. The walls 15 are screwed together by stainless steel self tapping screws 19.

The panel 10 is supported in the housing by header pipes 12 passing through walls 15. As pipes 11 and 12 are of copper construction the header pipes 12 are mounted in walls 15 by rubber or plastics material mounting grommets 23 to counter-act any electrolysis occurring.

Insulation material 22 is provided beneath panel 10 and around a substantial part of the surface of header pipes 12. This insulation is preferably fibreglass in the form of thick pads or so called batts.

As best seen in FIG. 1 there is at spaced intervals one transverse wall 13' which is of greater height than the remaining walls. This wall 13' extends for a distance such that it almost touches the underside of the glass cover 18. The extended wall 13' thus further reduces any heat loss by convection air currents passing over the panel surface. Referring to the example previously given walls 13' are approximately 5 mm higher than walls 13.

The heat exchanger is coupled to the storage tank in the conventional manner. A single exchanger can be used by itself or a number of units can be used together in a parrallel configuration (side by side) or in series (end on by multicasting the panel and placing in a longer housing).

The exchanger according to this invention has been devised to reduce cost in solar water heating by increased efficiency thus reducing the number of panels required. The unit construction of the panel is quick to manufacture and economical. In addition the integrally die cast water pipes have long life.

The walls provided on the panel serve two purposes. Firstly they restrict the formation of convection currents over the surface of the panel and secondly provide greater radiation impact over a wider varying angle of the sun's rays. Coupled with these advantages the grooved or ribbed surface of the panel between the walls provides maximum heat absorption and gives a surface which has good paint adhesion.

What I claim is:

1. A heat exchanger for a solar heater comprising: at least two pipes embedded within a one piece panel and upstanding walls of truncated triangular-shaped cross section extending from the surface of the panel, which said panel surface in use as the heat exchanger in a solar heater is the surface adapted to absorb solar radiation, said upstanding walls being integral with the panel and so positioned that a grid-like pattern of intersecting walls at right angle to one another is formed over the absorbing surface of the panel, the said walls which extend across the panel in one direction, except for those at the edge of the panel, being located above a said pipes and at least one of the upstanding walls which are at right angles to the walls extending in said one direction being of a height above the said absorbing surface greater than the remaining walls.

2. A heat exchanger as claimed in claim 1, wherein each portion of the absorbing surface bounded by said walls has a pattern of intersecting upstanding ribs.

3. A heat exchanger as claimed in claim 1, wherein said ribs are of a triangular cross-sectional shape.

4. A heat exchanger as claimed in claim 1, wherein each portion of the absorbing surface bounded by said walls has a pattern of intersecting V-shaped grooves.

5. A heat exchanger as claimed in claim 1, wherein the absorbing surface and upstanding wall surfaces have a coarse finish.

6. A heat exchanger as claimed in claim 1, wherein said absorbing surface and surfaces of the upstanding walls are coated with a matt dark color paint.

7. A heat exchanger as claimed in claim 1, wherein said pipes extend from said panel and are joined into a header pipe.

8. A heat exchanger as claimed in claim 1, wherein the panel and walls are of cast aluminium or aluminium alloy construction.

9. A heat exchanger as claimed in claim 1, wherein the pipes are of substantially elliptical cross-section.

10. A solar heat absorber comprising a heat exchanger located within a housing, said heat exchanger comprising at least two pipes embedded within a one-piece panel and upstanding walls of truncated triangular-shaped cross section extending from the surface of the panel which in use of the heat exchanger in a solar heater is the surface adapted to absorb solar radiation, said upstanding walls being integral with the panel and so positioned that a grid-like pattern of intersecting walls at right angles to one another is formed over the absorbing surface of the panel, the walls which extend across the panel in one direction, except for those at the edge of the panel, being located above a said pipes and at least one of the upstanding walls which are at right angles to the walls extending in said one direction being of a height above the said absorbing surface greater than the remaining walls, and said housing comprising an open-topped box with a translucent cover, the heat exchanger being supported in said housing by underlying insulation material and header pipes which extend between opposing walls of the housing and are joined with the pipes of the said panel.

11. An absorber as claimed in claim 10, wherein the walls of the housing have inwardly directed grooves at the top and bottom, said translucent cover being located between said top grooves and a base cover being located between said bottom grooves.

12. An absorber as claimed in claim 11, wherein the translucent cover and base are located in said wall grooves by plastic material seals.

13. An absorber as claimed in claim 10, wherein the panel walls are of extruded aluminium construction.

14. An absorber as claimed in claim 10, wherein the translucent cover is a glass sheet.

15. An absorber as claimed in claim 10, wherein the insulation is fiberglas pads.

16. An absorber as claimed in claim 10, wherein said higher wall or walls of said panel are of such a height that they terminate just short of the inner surface of the translucent cover.

17. An absorber as claimed in claim 10, wherein the panel is of cast aluminium or aluminium alloy construction and said pipes are of copper construction and have a substantially elliptical cross-sectional shape, the header pipes being mounted in the housing walls by rubber or plastic material grommets.

* * * * *